(12) United States Patent  
Sakamoto et al.

(10) Patent No.: US 8,115,436 B2
(45) Date of Patent: Feb. 14, 2012

(54) MOTOR CONTROL APPARATUS AND MOTOR SYSTEM

(75) Inventors: Kiyoshi Sakamoto, Hitachinaka (JP); Tomohiro Sugino, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 609 days.

(21) Appl. No.: 12/255,693

(22) Filed: Oct. 22, 2008

(65) Prior Publication Data

US 2009/0108784 A1    Apr. 30, 2009

(30) Foreign Application Priority Data

Oct. 26, 2007  (JP) ................................. 2007-278282

(51) Int. Cl.
    *H02P 6/00* (2006.01)
(52) U.S. Cl. .............. 318/400.32; 318/636; 318/400.26; 318/400.34
(58) Field of Classification Search .................. 318/636, 318/400.04, 400.17, 400.26, 400.27, 400.32, 318/400.34
    See application file for complete search history.

(56) References Cited

U.S. PATENT DOCUMENTS

| 5,198,733 A | | 3/1993 | Wright | |
|---|---|---|---|---|
| 5,256,952 A | * | 10/1993 | Yoneyama et al. | 318/629 |
| 5,497,062 A | * | 3/1996 | Fenstermacher et al. | 318/599 |
| 6,326,760 B1 | | 12/2001 | Cardoletti et al. | |
| 6,995,530 B2 | * | 2/2006 | Biamonte et al. | 318/400.33 |
| 7,342,378 B2 | * | 3/2008 | Sakamoto et al. | 318/717 |
| 7,460,974 B2 | * | 12/2008 | Wu et al. | 702/142 |
| 7,560,889 B2 | * | 7/2009 | Kimmelmann | 318/611 |
| 2002/0149341 A1 | | 10/2002 | Tao | |
| 2007/0120519 A1 | | 5/2007 | Sakamoto et al. | |

FOREIGN PATENT DOCUMENTS

JP    2007-151351    6/2007

OTHER PUBLICATIONS

Bonvin et al "Low cost sensorless position detection for brushless DC motor", 8th European Conference on Power Electronics and Applications, Lausanne, CH, Sep. 7-9, 1999, European Conference on power Electronics and Application, vol. 8, Sep. 7, 1999, pp. 1-09.

* cited by examiner

*Primary Examiner* — Paul Ip
*Assistant Examiner* — Thai Dinh
(74) *Attorney, Agent, or Firm* — Antonelli, Terry, Stout & Kraus, LLP.

(57) ABSTRACT

In a motor control apparatus, apparatus all switching devices of all phases of an inverter are kept fixed at OFF in accordance with a value of an all-OFF control pulse signal Poff outputted by a pulse generator. The pulse generator generates at least twice a pulse causing an induced voltage detection signal Pdet to change to an H level. A terminal voltage of a motor is inputted in accordance with the value of the induced voltage detection signal Pdet. Data of the sampling round in which amplitude of the induced voltage signal is great and the signal is not in saturation is selected from the data so inputted and a rotor position is estimated.

7 Claims, 10 Drawing Sheets

FIG. 4A  PHASE VOLTAGE DETECTION SYSTEM
TERMINAL VOLTAGE AMPLIFIER AND INDUCED VOLTAGE DETECTOR

FIG. 4B  LINE VOLTAGE DETECTION SYSTEM

MOTOR CONTROL APPARATUS AND MOTOR SYSTEM

BACKGROUND OF THE INVENTION

The present invention relates to a motor control apparatus and a motor system. More particularly, the present invention relates to a motor control apparatus and a motor system that can drive a permanent magnet synchronous motor without using a sensor for detecting a rotor position.

Among position sensor-less control technologies for controlling a permanent magnet synchronous motor without using a sensor for detecting a rotor position, a controlling method of a motor by measuring a terminal voltage of the motor and controlling the motor on the basis of the terminal voltage has been primarily used for driving apparatuses of motors having relatively low voltages. This method will be hereinafter called a "terminal voltage detection system".

As one of the terminal voltage detection systems, JP-A-2007-151351 discloses a technology that turns off all switching devices of a three-phase inverter at an arbitrary timing, measures the terminal voltage of the motor under a state where power is not fed to all the phases and estimates a rotor position.

This technology according to JP-A-2007-151351 can improve load follow-up performance in low speed revolution because it can shorten an observation cycle of the terminal voltage when the rotor position is estimated from the terminal voltage of the motor.

SUMMARY OF THE INVENTION

According to the driving method of JP-A-2007-151351 that turns off all the switching devices of the three-phase inverter at an arbitrary timing and periodically brings the motor current to zero, the motor torque is not naturally outputted during the period in which the current is zero. Therefore, when a load torque is applied to an output mechanical shaft of the motor, the rotor decelerates during the zero current period. The rate of this deceleration is determined by the magnitude of the load torque and the moment of inertia of the rotor. When the load torque is large or when the moment of inertia is small, for example, the rotor decelerates drastically.

In the technology of JP-A-2007-151351, the terminal voltage of the motor is measured after the passage of a predetermined time from turn-off of all the switching devices. Therefore, there is the case where the rotor speed drops near to zero before the measurement timing is reached or the case where the speed drops exactly to zero when the load torque and the moment of inertia satisfy a certain condition.

When the rotor speed drops close to zero depending on the measurement timing of the terminal voltage, the amplitude of an induced voltage appearing in the terminal voltage becomes small. In this case, noise becomes more influential and a correct rotor position cannot be estimated. As a result, the torque cannot be outputted and desynchronization may occur.

On the other hand, the system that periodically brings the motor current to zero and measures the terminal voltage of the motor involves the problem that measurement frequency cannot be increased easily because a predetermined time is necessary whenever the measurement is made. Therefore, when the motor is rotated at a high speed, the number of times of detection of the terminal voltage per revolution of the motor drops. When detection is made four times per revolution, for example, information of the rotor position can be acquired whenever rotor rotates 90°. It is therefore more advantageous to switch the control system to a position sensor-less control of another system in a high speed revolution range. Nonetheless, the problem of switching of the control systems occurs in this case.

More concretely, the technology of JP-A-2007-151351 described above is based on the driving system that periodically brings the motor current to zero. On the other hand, the position sensor-less control technology of the different system continuously passes the motor current. For this reason, the output torque of the motor becomes discontinuous and shock occurs when the control systems are switched.

It is therefore an object of the present invention to provide a motor control apparatus and a motor system that can estimate a rotor position and can accomplish a stable operation of a motor by reliably measuring a terminal voltage of the motor at a timing at which a rotor speed does not drop near to zero irrespective of the change of values of a load torque of the motor and the moment of inertia.

The motor control apparatus and the motor system according to the present invention have their feature in that switching devices of all phases of an inverter are turned off at an arbitrary timing, induced voltage information of the motor is acquired by sampling at least twice the motor voltage when all the phases of the switching devices are turned off, and a rotor position of the motor is estimated on the basis of this induced voltage information.

The present invention provides a motor control apparatus and a motor system that can estimate a rotor position and can accomplish a stable operation of a motor by reliably measuring a terminal voltage of the motor at a timing at which a rotor speed does not drop near to zero irrespective of the change of values of a load torque of the motor and the moment of inertia.

Other objects, features and advantages of the invention will become apparent from the following description of the embodiments of the invention taken in conjunction with the accompanying drawings.

DESCRIPTION OF THE EMBODIMENTS

A preferred embodiment of the present invention will be hereinafter explained in detail with reference to the accompanying drawings.

Figure 1:
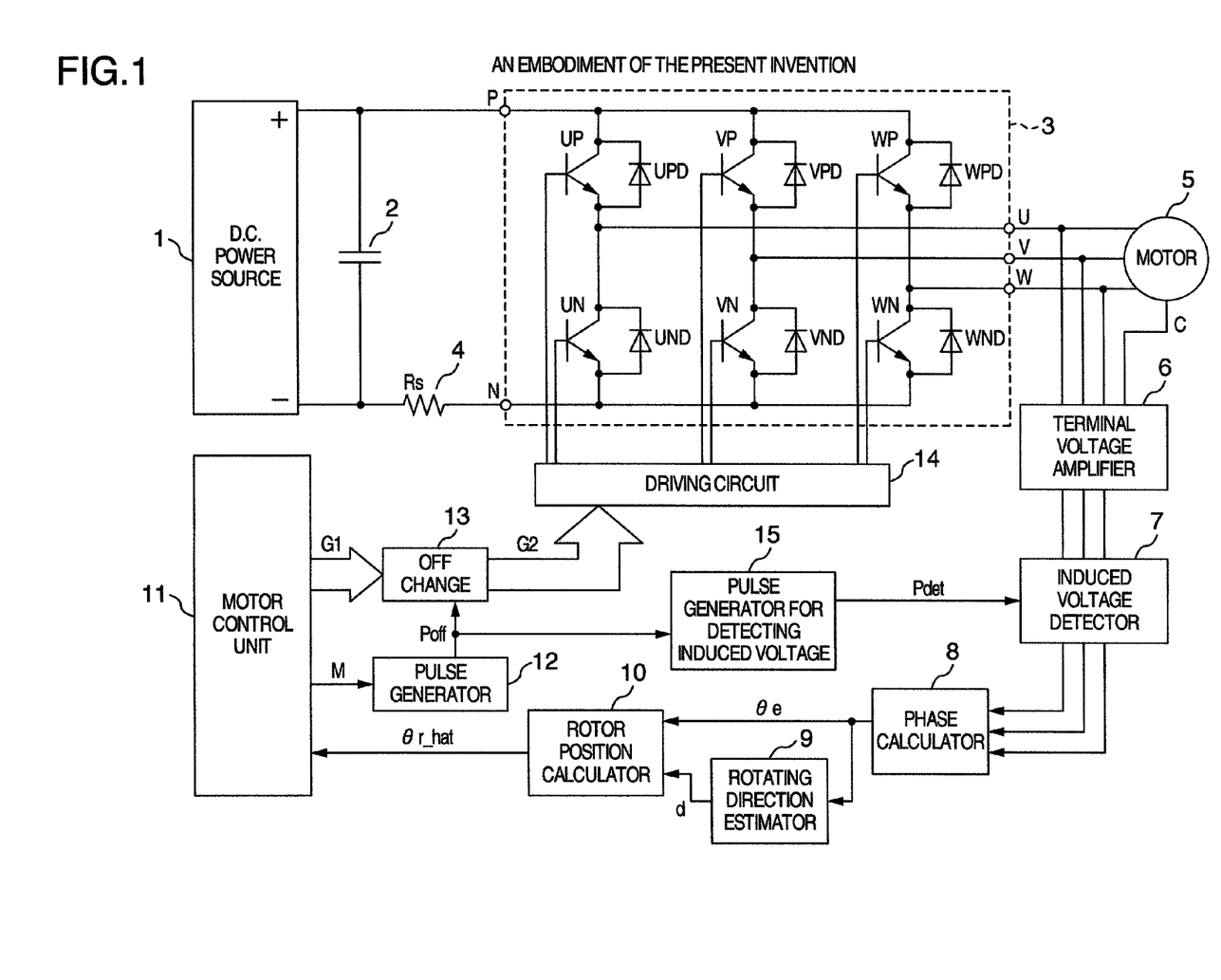
FIG. 1 is an overall control block diagram of a position sensor-less driving system of a permanent magnet synchronous motor according to an embodiment of the present invention.

FIG. 1 shows a structural view of a position sensor-less driving system of a permanent magnet synchronous motor as an embodiment of a motor control apparatus according to the present invention.

Referring to FIG. 1, a capacitor 2 for smoothing a D.C. voltage is connected between a positive terminal and a negative terminal of a D.C. power source 1. A D.C. positive terminal P of an inverter 3 is connected to the positive terminal of the capacitor 2. A D.C. negative terminal N of the inverter 3 is connected to the negative terminal of the capacitor 2 through a shunt resistor 4. A.C. terminals U, V and W of a synchronous motor 5 such as a permanent magnet synchronous motor as a control object are connected to the A.C. output terminals of the inverter 3. The synchronous motor 5 is driven by three-phase A.C. power supplied by the inverter 3.

A terminal voltage amplifier 6 is connected to the A.C. terminals (U, V, W) of the synchronous motor 5 and to a neutral terminal C of a stator winding. The terminal voltage amplifier 6 multiplies the voltage between the AC terminal (U, V, W) and the neutral terminal C by a predetermined gain and outputs the product as a terminal voltage signal. An induced voltage detector 7 takes in the voltage value of the terminal voltage signal at a specific timing in accordance with a later-appearing induced voltage detection signal Pdet and outputs this value as an induced voltage signal. A phase calculator 8 calculates an induced voltage phase θe from the value of the induced voltage signal. A rotating direction estimator 9 estimates the rotating direction of a rotor on the basis of the change of the induced voltage phase θe and outputs a rotating direction estimation signal d. A rotor position calculator 10 inputs the values of the rotating direction estimation signal d and the induced voltage phase θe and calculates and outputs a rotor position estimation value θr_hat.

A motor control unit 11 outputs an inverter driving signal G1 and a driving system signal M on the basis of the rotor position estimation value θr_hat. A pulse generator 12 outputs an all-OFF control pulse signal Poff in accordance with the driving system signal M. A signal processor 13 processes the inverter driving signal G1 in accordance with the value of the all-OFF control pulse signal Poff and outputs an inverter driving signal G2. The inverter driving signal G2 is inputted to a driving circuit 14. The output of the driving circuit 14 is inputted to control terminals of power semiconductor switching devices UP, UN, VP, VN, WP and WN such as IGBT or power MOSFETs constituting the inverter 3. The all-OFF control pulse signal Poff is connected to a pulse generator 15. The pulse generator 15 outputs an induced voltage detection signal Pdet.

Figure 2:
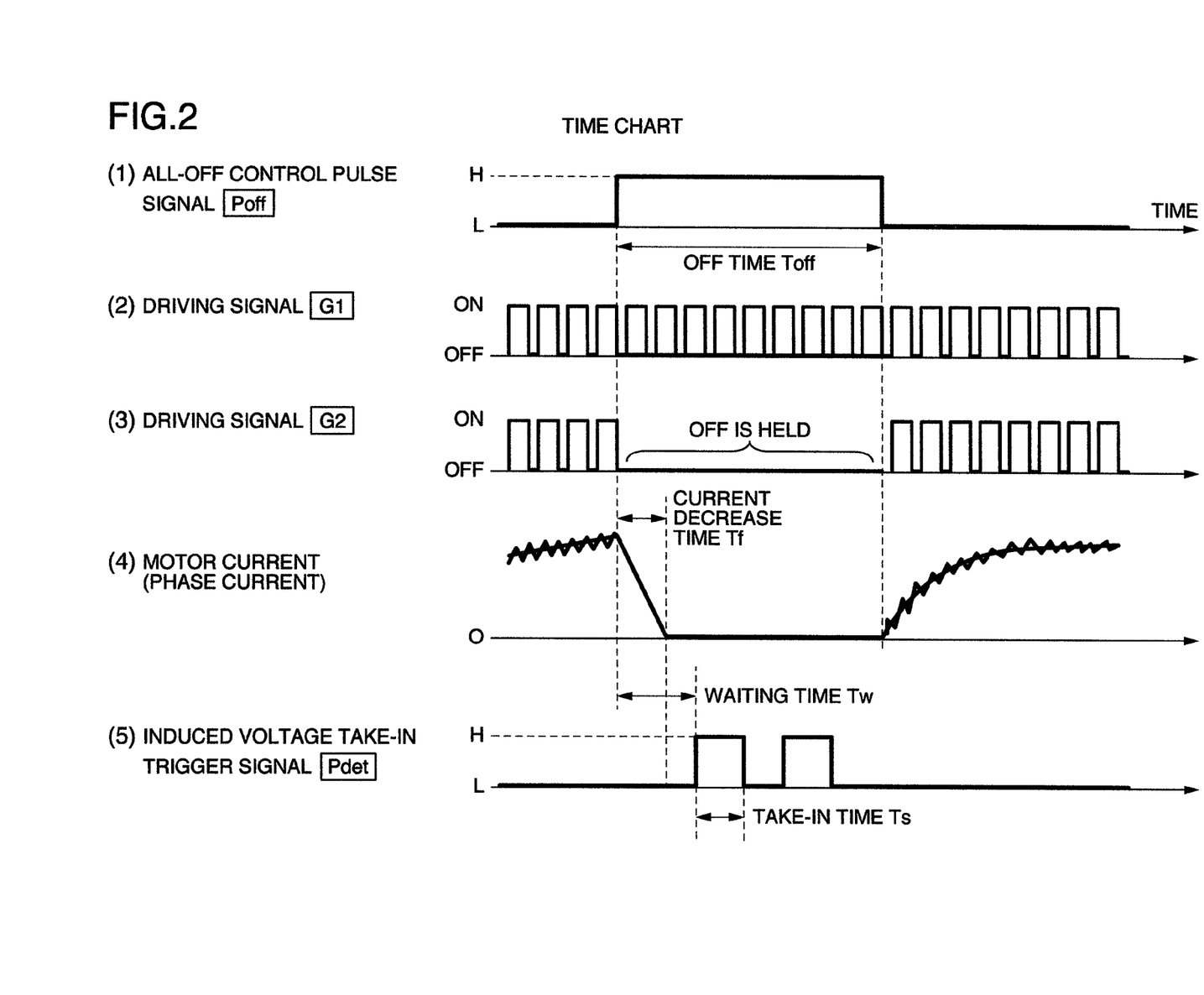
FIG. 2 is a time chart showing the relation of control signals in the embodiment of the present invention.

Next, the operation of this embodiment will be explained. To begin with, the operations of the signal processor 13 and the pulse generator 15 will be explained. FIG. 2 is a time chart showing the relation between each signal and the motor current.

The signal processor 13 changes the inverter driving signal G2 in accordance with the all-OFF control pulse signal Poff of (1) in FIG. 2. When the all-OFF control pulse signal Poff is at an L level, the same signal as the inverter driving signal G1 is outputted as the inverter driving signal G2. When the all-OFF control pulse signal Poff is at an H level, the signal processor 13 fixes the inverter driving signal G2 at the OFF level and turns off all the power semiconductor switching devices of the inverter 3.

Incidentally, FIG. 2 shows only one of the pulse signals contained in the inverter driving signals G1 and G2 for the sake of convenience of illustration. In practice, the inverter driving signals G1 and G2 are the signals for driving the power semiconductor switching devices UP, UN, VP, VN, WP and WN constituting the inverter 3 as described above and have six pulse signals. The inverter driving signal G1 is a three-phase sine wave pulse width modulation signal for 180-degree power feed driving.

When the power semiconductor switching devices of the inverter 3 are driven by the inverter driving signal G2, the motor current changes as shown in (4) of FIG. 2. First, when the all-OFF control pulse signal Poff is at the L level, the output of the inverter 3 is the voltage subjected to the three-phase sine wave pulse width modulation and the motor current flows. Here, when the all-OFF control pulse signal Poff changes to the H level, all the power semiconductor switching devices of the inverter are turned off. In consequence, the motor current decreases and reaches zero after the passage of a predetermined time.

Figure 3:
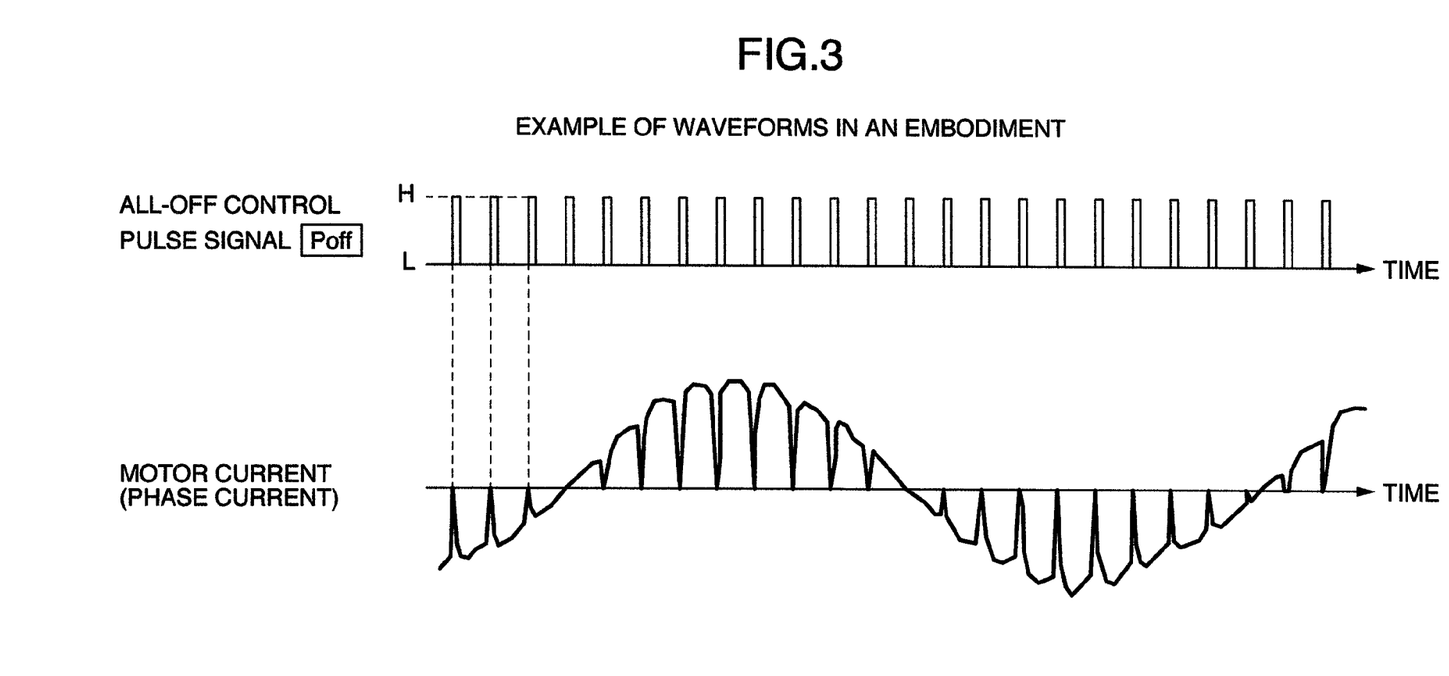
FIG. 3 is an explanatory view of a motor current waveform in the embodiment of the present invention.

FIG. 3 shows an example of the motor current waveform when the operation is made in this embodiment. Here, the all-OFF control pulse signal Poff is set to the H level in a predetermined cycle. When the all-OFF control pulse signal Poff changes to the H level, all the power semiconductor switching devices of the inverter 3 are turned off and the motor current temporally drops to zero. When driving is made by the voltage subjected to the three-phase sine wave pulse width modulation, the motor current should originally flow in the sine wave form but when driving is made by the present embodiment, the current waveform becomes the an A.C. current waveform having slits in a comb shape as shown in FIG. 3.

FIG. 2(5) shows the change of the induced voltage detection signal Pdet. The induced voltage detection signal Pdet is the signal that changes to the H level with the delay of a waiting time Tw after the all-OFF control pulse signal Poff changes to the H level.

In the present invention, this Pdet pulse signal is generated at least twice. The pulse signal has the width (time in which Pdet keeps H level) that corresponds to the take-in time Ts.

The take-in time Ts is the time that is necessary for taking in the induced voltage and changes with a concrete construction of the induced voltage detector 7 and the phase calculator 8. A concrete example of the take-in time Ts is a sample time of an A/D converter when the A/D converter is used for taking in the induced voltage.

The waiting time Tw is set to a time longer than the time Tf at which the motor current reaches zero. On the other hand, the time Toff for which all the semiconductor switching devices are kept OFF is set in such a fashion as to satisfy the following inequality in which Tw is the waiting time, n is the number of times of pulse signal Pdet and Ts is the take-in time.

$$Toff \geq Tw + Ts \times n$$

Figure 4A:
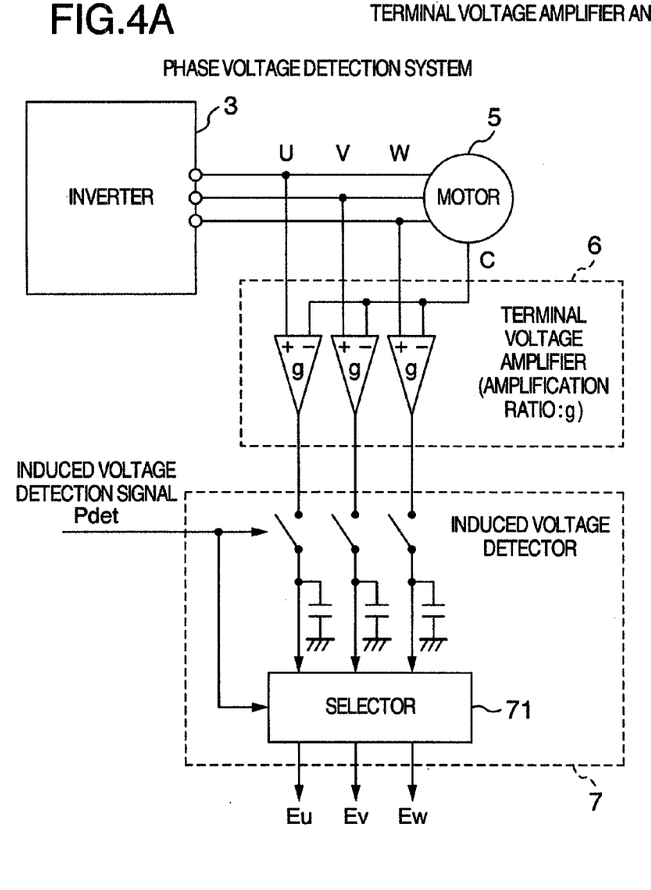
FIGS. 4A and 4B are explanatory views of a terminal voltage amplifier and an induced voltage detector in the embodiment of the present invention.
Figure 4B:
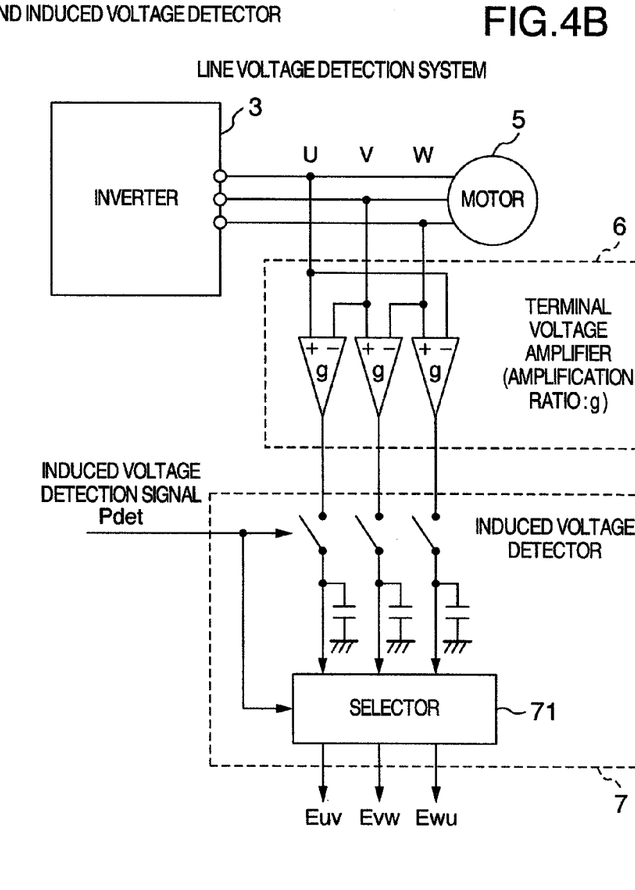

FIGS. 4A and 4B show structural examples of the terminal voltage amplifier 6 and the induced voltage detector 7. FIG. 4 shows two examples. FIG. 4A shows a phase voltage detection system and FIG. 4B does a line voltage detection system. The terminal voltage amplifier 6 is constituted by three differential input type amplifiers.

Incidentally, the amplification ratio of the amplifier is g times in FIGS. 4A and 4B. In the case of the line voltage detection system shown in FIG. 4B, a neutral terminal C of a stator winding is not necessary.

The induced voltage detector 7 detects the terminal voltage signal outputted by the terminal voltage amplifier 6 when the level of the induced voltage detection signal Pdet is at the H level. FIGS. 4A and 4B show an example using a sample-and-hold circuit as an example of the induced voltage detector 7. The switching devices of the sample-and-hold circuit are generally turned ON when the induced voltage detection signal Pdet is at the L level and are switched to OFF when the induced voltage detection signal Pdet changes to the H level, so that the potential of the terminal voltage signal at that time is held in a capacitor. Because the motor current is zero when the induced voltage detection signal Pdet is at the H level, the terminal voltage signal held is the one obtained by multiplying by g the induced voltage resulting from the speed electromotive force.

In the present invention, the pulse signal of the induced voltage detection signal Pdet is generated at least twice. Therefore, when Pdet rises to the H level and the potential of the terminal voltage signal is held by the capacitor of the sample-and-hold circuit, a selector 71 measures the potential and holds altogether the potentials for the three-phases when Pdet reaches the L level and the potential of the terminal voltage signal is held by the capacitor of the sample-and-hold circuit.

Explanation will be given hereby about the case where the pulse signal of Pdet is generated thrice in the line voltage detection system shown in FIG. 4B. In this case, the selector 71 holds the terminal voltage information as the line voltages of three times. Suffix will be used to distinguish the sequence of generation. The selector 71 holds the values of (Euv1, Evw1, Ewu1), (Euv2, Evw2, Ewu2) and (Euv3, Evw3, Ewu3). The terminal voltage information of which round is suitable is judged by the later-appearing procedure and the data is outputted as Euv, Evw, Ewu signals.

Incidentally, the motor output torque does not take a constant value in the motor current waveform shown in FIG. 3. For, the motor output torque drops to zero when the motor current reaches zero. Therefore, the motor output torque changes with the same frequency as the frequency that sets the all-OFF control pulse signals Poff to the H level.

The change of the motor output torque and the change of the motor speed will be explained with reference to FIGS. 5 and 6. It will be assumed hereby that the rotor of the motor revolves in according with the following equation of motion.

$$Tm-TL=J\cdot d\omega m/dt$$

where:
Tm: motor output torque
TL: load torque
J: moment of inertia
dωm/dt: time differential of motor speed ωm To simplify the explanation, it will be assumed that an H:L ratio of the all-OFF control pulse signal Poff is 1:1 as shown in FIGS. 5 and 6. It will be further assumed that the motor torque Tm is zero when the all-OFF control pulse signal Poff is at the H level and a predetermined quantity of the motor torque Tm is generated when Poff is at the L level.

Figure 5:
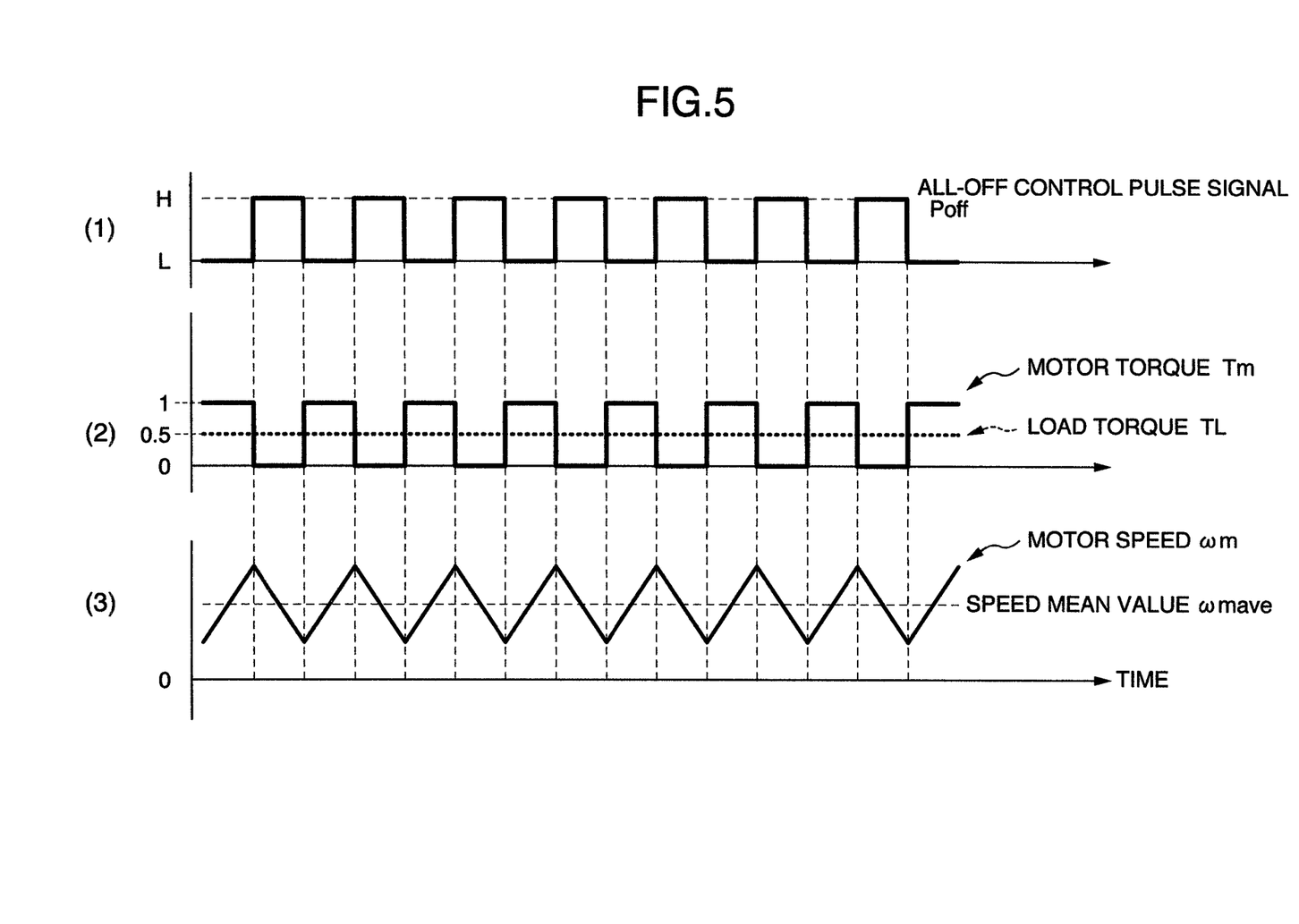
FIG. 5 is an explanatory view showing the relation between a motor torque and a motor speed change in the embodiment of the present invention.

When the motor torque Tm having magnitude "1" is interrupted as shown in FIG. 5(2), the motor speed ωm repeats the increase and decrease as shown in FIG. 5(3). When the mean value ωmave of the motor speed ωm is constant, the mean value of the motor output torque and the load torque TL balance at 0.5. The relation between the motor torque Tm and the load torque TL can be expressed as in FIG. 5(2).

Figure 6:
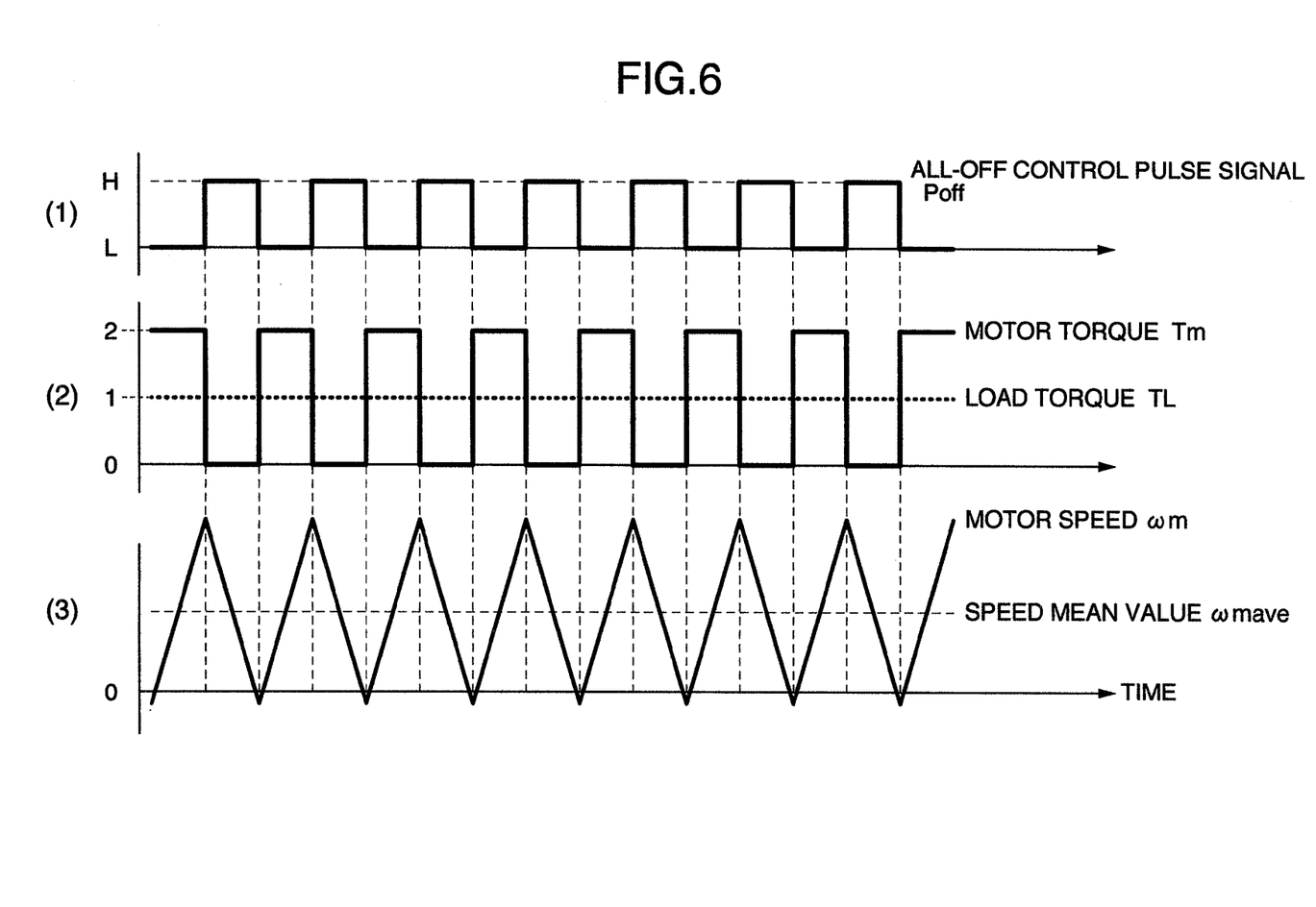
FIG. 6 is an explanatory view showing the relation between the motor torque and the motor speed change in the embodiment of the present invention.

Referring to FIG. 6, it will be assumed that the motor torque Tm is generated in the magnitude "2" (twice as the level shown in FIG. 5) when Poff is at the L level. In this case, the change of the motor speed ωm is the one shown in FIG. 6(3) and is remarkably greater when compare with FIG. 5(3). If the mean value ωmave of the motor speed ωm is equal in both FIGS. 5 and 6, the motor speed drops below zero because the time change ratio of the drop of the motor speed is twice in FIG. 6 in comparison with FIG. 5.

It could be appreciated from the explanation given above that when the motor is driven at a certain constant speed and the load torque is increased, there is the possibility that the motor speed drops near to zero during the period in which the current is kept at zero. Suppose the motor speed drops near to zero at the timing of the induced voltage detection, the influences of the noise becomes greater because the amplitude of the induced voltage is low and the correct rotor position cannot be estimated. As a result, the torque cannot be outputted and desynchronization takes place.

A method for avoiding the problem described above will be explained with reference to FIG. 7. The drawing illustrates the state where the all-OFF control pulse signal Poff is set to the H level, the motor current is zero and the rotor speed ωm changes. It will be assumed that the rotor speed ωm first decelerates, drops once to zero and thereafter increases to the opposite side. It could be appreciated that the amplitude of the induced voltage signal changes with the change of the rotor speed ωm. It will be assumed hereby that the terminal voltage amplifier 6 contains a circuit for adding the zero level of the terminal voltage to 2.5 [V].

Figure 7:
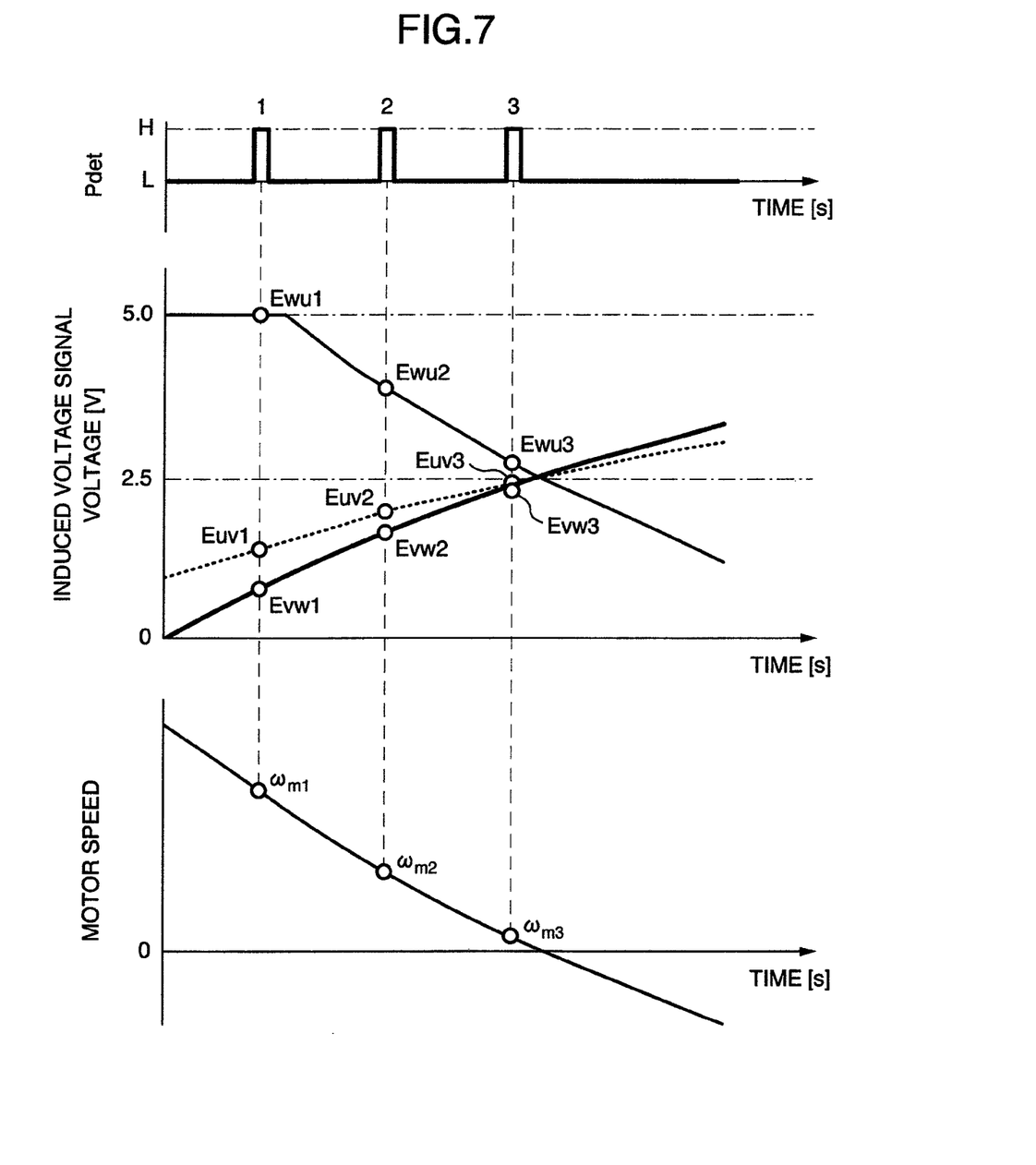
FIG. 7 is an explanatory view of detection of an induced voltage signal in the embodiment of the present invention.

Therefore, the induced voltage signal changes between maximum 0 and 5 with the 2.5 [V] level as the center.

In FIG. 7, the pulse signal of the induced voltage detection signal Pdet is generated thrice and the take-in value of the induced voltage signal at that time is indicated by circle. The induced voltage signal taken in by the first Pdet pulse signal is called "Euv1, Evw1, Ewu1". Similarly, the signal taken in by the second Pdet pulse signal is called "Euv2, Evw2, Ewu2" and the signal taken in by the third Pdet pulse signal, "Euv3, Evw3, Ewu3".

The present invention selects the induced voltage signal data of the best round from the three induced voltage signal data so taken in and calculates the rotor position.

Next, a method for selecting the data of which round from the three rounds of the induced voltage signal data will be explained.

In the case of FIG. 7, since the rotor speed is high in the first take-in round, the induced voltage signal Ewu is limited to 5 [V] beyond the range of 0 to 5 [V]. Therefore, the resulting Ewu1 takes the limited value of 5.0 [V]. In the third take-in round, on the other hand, the motor speed is near zero and each of Euv3, Evw3 and Ewu3 takes a value close to the zero level of the induced voltage signal (2.5 [V] in terms of voltage value). It could be appreciated that in comparison with the first and third rounds, each of Euv2, Evw2 and Ewu2 falls within the range of 0 to 5 [V] in the second take-in round. In the example shown in FIG. 7, it is preferred to select the data of the second round, i.e. Euv2, Evw2 and Ewu2, and to estimate the rotor position.

The data of which round should be selected from among the data of the induced voltage signals taken in n times may be decided by following the following procedures (1) and (2).
(1) The data of the round in which the amplitude of the induced voltage signal is high (at least above the voltage exceeding a predetermined value at which influences of noise are not great) and the signal is not in saturation are selected.
(2) When the data corresponding to the condition (1) do not exist, the data of the round in which the saturation number of the induced voltage signal is small is selected.

Incidentally, the term "saturation number" means the number of signals reaching the saturation level. In the first take-in round shown in FIG. 7, only Ewu1 gets into saturation and the saturation number is 1. The maximum value of the saturation number is 3.

According to the procedures described above, since the round in which the induced voltage signal taking a value close to the zero level (2.5 [V] in terms of voltage value) is removed, it is possible to avoid the problem that the correct rotor position cannot be estimated.

Incidentally, FIG. 7 illustrates the case where the pulses are outputted thrice as Pdet and the induced voltage signals are detected thrice. However, the method proposed by the present invention can select the better result by detecting the signals at least twice and can therefore acquire the analogous result.

A method for reducing the shock of the motor output torque when the driving system that periodically brings the motor current to zero and the driving system that continuously passes the motor current are switched in accordance with the rotating speed will be explained with reference to FIGS. 8 through 10.

Figure 8:
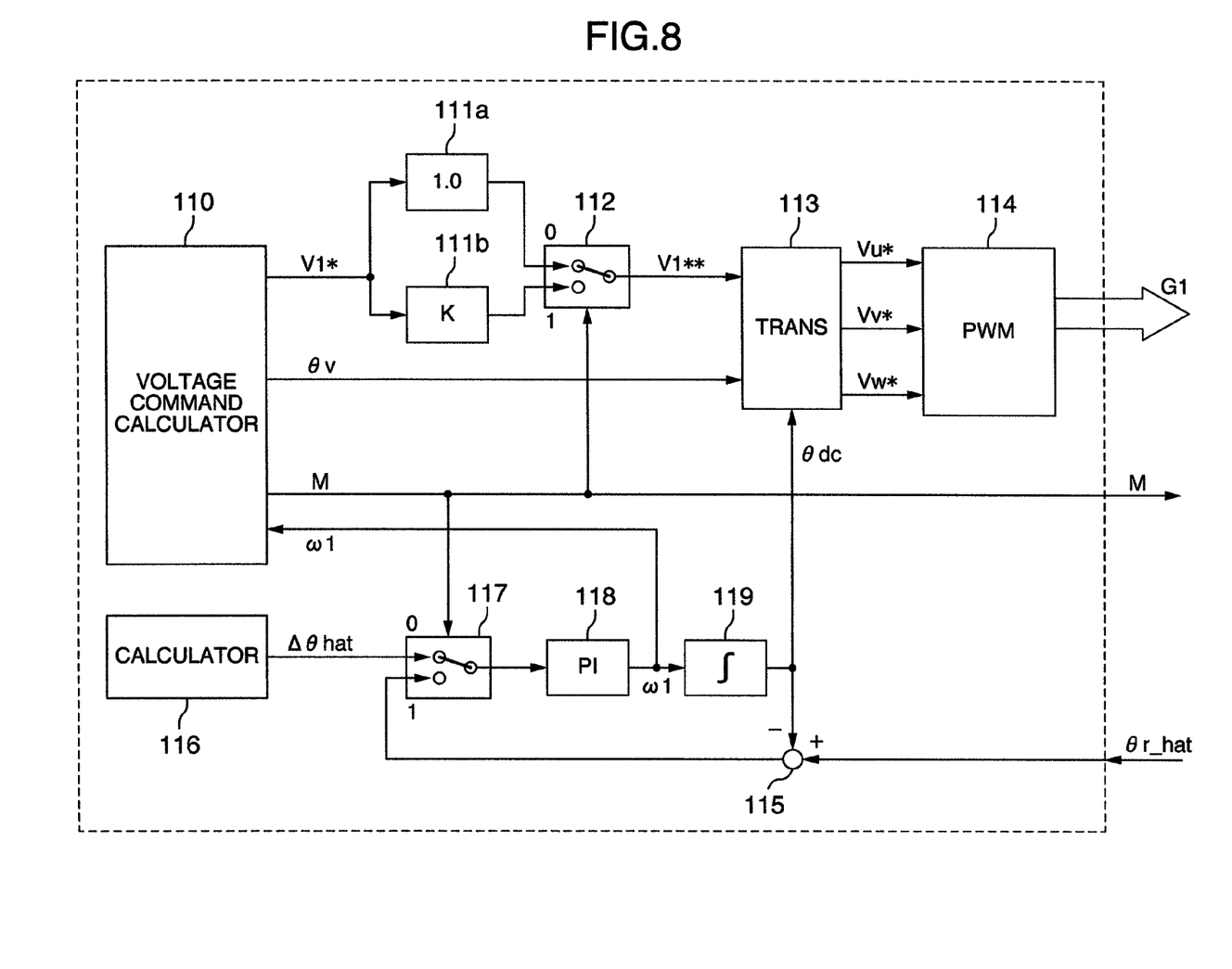
FIG. 8 is an explanatory view useful for explaining a control construction of a motor control unit 11 in the embodiment of the present invention.

FIG. 8 shows in detail an example of the internal construction of the motor control unit 11. Referring to FIG. 8, a voltage command calculator 110 output an amplitude V1* (motor voltage command), a phase angle θv of an A.C. voltage command and a driving system signal M on the basis of a value of an internal angular frequency ω1 of the later-appearing control system. The operation of the pulse generator 12 described above changes depending on the value of the driving system signal M. When M is 1, the pulse generator 12 outputs the all-OFF control pulse signal Poff and the driving system that periodically brings the motor current to zero becomes effective. When M is 0, on the other hand, the driving system is the one that continuously passes the motor current because the pulse generator 12 does not output the all-OFF control pulse signal Poff.

The amplitude V1* is amplified to 1.0 time by the amplifier 111a. Similarly, the amplitude V1* is amplified k times by the amplifier 111b. Here, k satisfies the relation k>1. A selector 112 processes the output signals of the amplifiers 111a and 111b, and the amplitude V1** of the A.C. voltage command after correction is outputted. The selector 112 selects the signal of the amplifier 111b when M is 1. On the other hand, the selector 112 selects the signal of the amplifier 111a when M is 0.

The three-phase voltage command calculator 113 calculates three-phase voltage commands Vu*, Vv* and Vw* on the basis of the voltage command phase angle θv and the estimated d axis phase θdc. A PWM converter 114 outputs an inverter driving signal G1 subjected to pulse width modulation on the basis of the three-phase voltage command given as the input.

An adder 115 calculates the difference (θr_hat−θdc) between the rotor position estimation value θr_hat calculated on the basis of the induced voltage signal and the estimated d axis phase θdc. On the other hand, a calculator 116 using a known position sensor-less algorithm calculates an estimation value Δθhat of an axis error angle. The term "axis error angle" means the amount defined by the difference between the estimated d axis phase θdc and the real d axis phase θd. The selector 117 selects the output signal of the adder 115 when M is 1. When M is 0, on the other hand, the selector 117 calculates the output signal of the calculator 116. A PI compensator 118 calculates an internal angular frequency ω1 of the control system by using the output signal of the selector 117 as an error input. The internal angular frequency ω1 is integrated by an integrator 119 and the estimated d axis phase θdc is outputted.

Incidentally, the calculator 116 using the known position sensor-less algorithm estimates the estimation value of the axis error angle by using the information of the voltage command value, the observation value of the motor current, internal frequency information, and so forth, though not shown in FIG. 8. Unit for observing the motor current is not shown in FIG. 1 but methods include a method that uses a current sensor for measuring the current at the A.C. terminals (U, V, W) of the synchronous motor 5 and a method that measures a voltage across both terminals of the shunt resistor 4 and measures the current of the synchronous motor 5.

Next, the operation of FIG. 8 will be explained.

The driving system signal M is decided on the basis of the value of the motor driving frequency (that is, internal angular frequency of control system) ω1. M=1 is outputted in a low speed range and M=0, in a high speed range. When the driving system signal M is 1, the driving system that periodically brings the motor current to zero is effective as described already. In this case, A.C. voltage amplitude V1** after correction is k times the value C1*. When M is 0, on the other hand, the driving system that continuously passes the motor current is effective. The corrected A.C. voltage amplitude V1** is equal to V1* in this case. Owing to the operations described above, the voltage amplitude of the three-phase voltage command is set to a large value in the driving system that periodically brings the motor current to zero.

Figure 9:
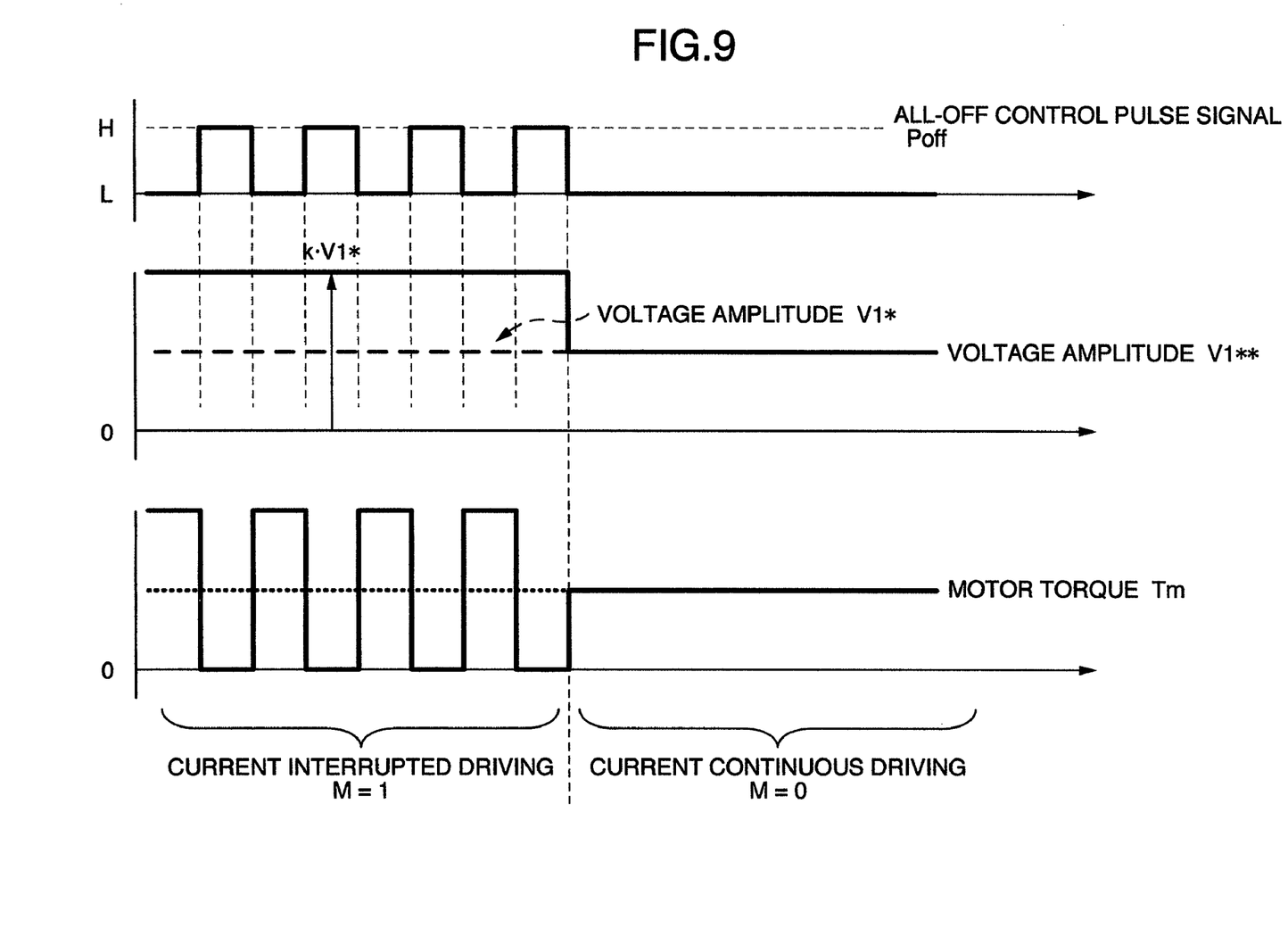
FIG. 9 is an explanatory view useful for explaining a motor torque change when a driving system is switched in the embodiment of the present invention.

FIG. 9 shows on the left side the driving system that periodically brings the motor current to zero at M=1 and on the right side the driving system that continuously passes the motor current. The original A.C. voltage amplitude V1* remains constant but in this invention, the amplitude of the voltage command is multiplied k times in current interrupted driving to generate the voltage amplitude V1** after correction. As a result, the motor current increases during current interrupted driving and the maximum value of the motor torque increases, too.

Switching shock becomes small when the difference between the mean value of the motor torque Tm under the current interrupted driving state and the motor torque Tm during the current continuous driving state is small. Therefore, the gain k of the amplifier 111b must be set appropriately.

A theoretical formula of the set value of the gain k is derived. It will be assumed hereby that the motor current reaches zero in a cycle time T. It will be assumed further that the time for which the current is kept at zero is t (0<t<T). A ratio r of the period in which the motor current is zero is defined as r=t/T.

The voltage amplitude V1** under the current interrupted driving state is given by k·V1*. Because all the switching devices of the inverter are periodically turned OFF, however, the mean of the voltage amplitude outputted in practice can be regarded as k·V1*·(1−r). Because the voltage amplitude under the current continuous driving state is V1*, on the other hand, the equation is solved by assuming that both are equal and the following relational formula is given:

$$k=1/(1-r)=T/(T-t)$$

Figure 10:
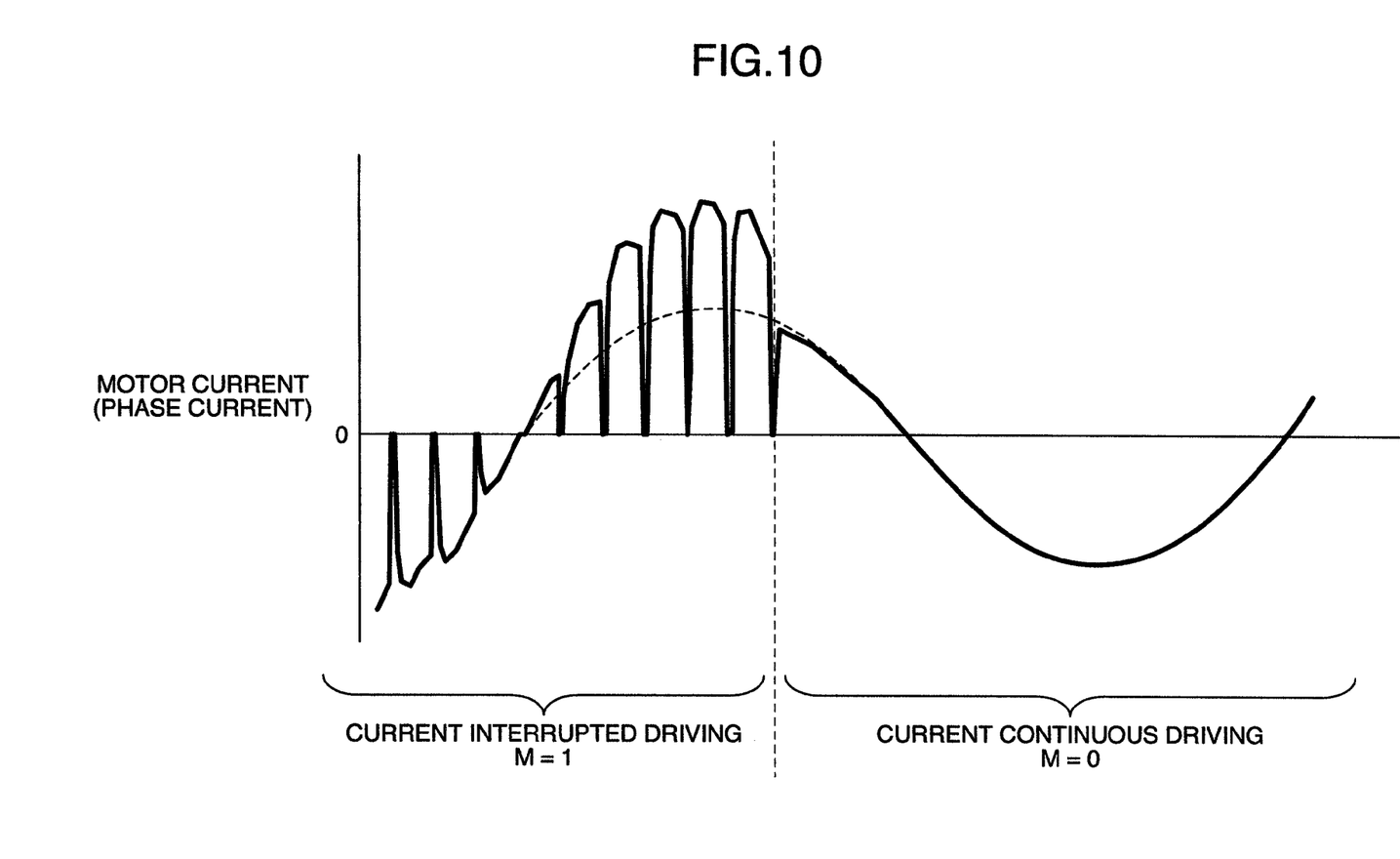
FIG. 10 is an explanatory view of a motor current waveform when the driving system is switched in the embodiment of the present invention.

FIG. 10 shows an example of the change of the motor current when the driving system signal M is changed from 1 to 0. When the driving system is changed from current interrupted driving to current continuous driving, the magnitude of the voltage amplitude V** of the voltage command changes as already described. Therefore, the peak value of the current changes and takes the waveform shown in FIG. 10.

Though FIG. 10 shows the example of switching from current interrupted driving to current continuous driving, the waveform becomes similar when the driving systems are switched in the opposite direction.

A method that outputs the voltage command by using a measurement value of the motor current is also known as the voltage command calculator 110. Current control becomes possible when the measurement value of the motor current is fed back and the performances of the present invention can be improved.

As described above, the position sensor-less control apparatus of the permanent magnet synchronous motor according to the present invention detects at least twice the terminal voltage by changing the detection timing while the motor current is kept zero and can measure the terminal voltage of the motor at the timing at which the rotor speed is not near zero. Therefore, the motor control apparatus can estimate the rotor position by acquiring the induced voltage information of the motor and can output the motor torque without desynchronization.

Consequently, the present invention can accomplish the stable operation of the motor without desynchronization in motor control apparatuses not using a position sensor.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A motor control apparatus, wherein switching devices of all phases of an inverter for controlling a permanent magnet synchronous motor without using a rotor position sensor are turned off at an arbitrary timing, induced voltage information of said permanent magnet synchronous motor is acquired by sampling a motor voltage at least twice when all the phases of said switching devices are turned off and the rotor position of said permanent magnet synchronous motor is estimated on the basis of information of the induced voltage, said motor control apparatus further comprising a conversion result selection unit for selecting the result of a certain one sampling round from the result of sampling made at least twice.

2. The motor control apparatus according to claim 1, wherein the sampling result, in which the amplitude of said induced voltage information is the greatest and said induced voltage is not in saturation, is selected by said conversion result selection unit.

3. The motor control apparatus according to claim 1, wherein the sampling result, in which the amplitude of said induced voltage is equal to or more than a predetermined value of a voltage not easily affected by noise and said induced voltage is not in saturation, is selected by said conversion result selection unit.

4. A motor control apparatus, wherein switching devices of all phases of an inverter for controlling a permanent magnet synchronous motor without using a rotor position sensor are turned off at an arbitrary timing, induced voltage information of said permanent magnet synchronous motor is acquired by sampling a motor voltage at least twice when all the phases of said switching devices are turned off and the rotor position of said permanent magnet synchronous motor is estimated on the basis of information of the induced voltage, wherein a period in which said switching devices of all the phases are turned off at an arbitrary timing and a period in which said switching devices of all the phases are not turned off are switched by a motor revolution speed, and wherein a motor voltage command value is increased by a predetermined gain in the period in which said switching devices of all the phases are turned off at an arbitrary timing, and switching of a period in which said switching devices of all the phases are turned off at an arbitrary timing and a period in which said switching devices of all the phases are not turned off is made in such a fashion that effective values of the motor currents become substantially equal to each other before and after switching.

5. The motor control apparatus according to claim 4, wherein said predetermined gain k is given by k=T/(T−t) (with the proviso that t<T) where t is the time in which the motor current is zero in one round of OFF period in which said switching devices of all the phases are turned off at an arbitrary timing and T is the cycle in which said switching devices of all the phases are turned off at an arbitrary timing.

6. A motor system comprising:
a permanent magnet synchronous motor;
an inverter for driving said permanent magnet synchronous motor; and
a motor control apparatus for controlling said inverter without using a rotor position sensor,
said motor control apparatus controlling the motor such that switching devices of all phases of said inverter are turned off at an arbitrary timing, a motor voltage is sampled at least two rounds when all the phases of said switching devices are turned off to acquire induced voltage information of said motor and the rotor position of said motor is estimated on the basis of said induced voltage information,
said motor control apparatus further comprising a conversion result selection unit for selecting the result of a certain one sampling round from the result of sampling made at least twice.

7. A motor system comprising;
a permanent magnet synchronous motor;
an inverter for driving said permanent magnet synchronous motor; and
a motor control apparatus for controlling said inverter without using a rotor position sensor,
said motor control apparatus controlling the motor such that switching devices of all phases of said inverter are turned off at an arbitrary timing, a motor voltage is sampled at least two rounds when all the phases of said switching devices are turned off to acquire induced voltage information of said motor and the rotor position of said motor is estimated on the basis of said induced voltage information,
wherein a period in which said switching devices of all the phases are turned off at an arbitrary timing and a period in which said switching devices of all the phases are not turned off are switched by a motor revolution speed, and
wherein a motor voltage command value is increased by a predetermined gain in the period in which said switching devices of all the phases are turned off at an arbitrary timing, and switching of a period in which said switching devices of all the phases are turned off at an arbitrary timing and a period in which said switching devices of all the phases are not turned off is made in such a fashion that effective values of the motor currents become substantially equal to each other before and after switching.

* * * * *